(12) United States Patent
Maev et al.

(10) Patent No.: US 12,510,512 B2
(45) Date of Patent: Dec. 30, 2025

(54) COMPREHENSIVE REAL-TIME CHARACTERIZATION OF ULTRASONIC SIGNATURES FROM NONDESTRUCTIVE EVALUATION OF RESISTANCE SPOT WELDING PROCESS USING ARTIFICIAL INTELLIGENCE

(71) Applicant: Tessonics Corp., Birmingham, MI (US)

(72) Inventors: Roman Gr. Maev, Windsor (CA); Donald Ryan Scott, Windsor (CA); Andriy Chertov, Windsor (CA); Danilo Stocco, Windsor (CA)

(73) Assignee: Tessonics Corp., Birmingham, MI (US)

( * ) Notice: Subject to any disclaimer, the term of this patent is extended or adjusted under 35 U.S.C. 154(b) by 615 days.

(21) Appl. No.: 17/882,927

(22) Filed: Aug. 8, 2022

(65) Prior Publication Data

US 2023/0228716 A1     Jul. 20, 2023

Related U.S. Application Data

(60) Provisional application No. 63/230,221, filed on Aug. 6, 2021.

(51) Int. Cl.
*G01N 29/04*     (2006.01)
*B23K 11/00*     (2006.01)
(Continued)

(52) U.S. Cl.
CPC .......... *G01N 29/04* (2013.01); *B23K 11/0026* (2013.01); *B23K 11/115* (2013.01);
(Continued)

(58) Field of Classification Search
CPC .... B23K 11/00–362; B23K 31/00–125; G01N 29/00–52
See application file for complete search history.

(56) References Cited

U.S. PATENT DOCUMENTS 5,566,092 A * 10/1996 Wang ................. G05B 19/4184
706/912
5,764,859 A *  6/1998 Kim ......................... G06N 3/08
706/31

(Continued)

OTHER PUBLICATIONS

"TimeDistributed layer," Keras.io, dated Jun. 17, 2021 (retrieved via the Wayback Machine on Feb. 6, 2025) (Year: 2021).*

*Primary Examiner* — Judy Nguyen
*Assistant Examiner* — James Split
(74) *Attorney, Agent, or Firm* — Carlson, Gaskey & Olds, P.C.

(57) ABSTRACT

Automated real-time characterization of resistance spot welds using ultrasound-based nondestructive evaluation requires a computational process and system to accurately and rapidly interpret the ultrasonic data in real time. Such a process can be automatically learned using artificial intelligence, from a dataset of exemplary ultrasonic data from nondestructive evaluation of resistance spot welds for which a corresponding ideal evaluation of each weld is provided. The process can then be implemented into a system to automatically interpret data from non-destructive evaluation in real-time. The ideal evaluation of each weld requires identification a large set of features that are observable in the ultrasonic signature and comprehensively characterize the corresponding weld process.

19 Claims, 10 Drawing Sheets

(51) Int. Cl.
    *B23K 11/11*   (2006.01)
    *B23K 31/12*   (2006.01)
    *G01N 29/44*   (2006.01)
    *G06N 3/0442*  (2023.01)
    *G06N 3/0464*  (2023.01)
(52) U.S. Cl.
    CPC ....... *B23K 31/125* (2013.01); *G01N 29/4454* (2013.01); *G01N 29/4481* (2013.01); *G06N 3/0442* (2023.01); *G06N 3/0464* (2023.01); *B23K 11/11* (2013.01); *G01N 2291/0234* (2013.01); *G01N 2291/101* (2013.01); *G01N 2291/2672* (2013.01)

(56) References Cited

U.S. PATENT DOCUMENTS

| | | | | |
|---|---|---|---|---|
| 5,892,197 | A * | 4/1999 | Goto | B23K 11/256 |
| | | | | 219/110 |
| 6,018,729 | A * | 1/2000 | Zacharia | G05B 13/027 |
| | | | | 219/130.01 |
| 6,857,553 | B1 * | 2/2005 | Hartman | G01N 29/46 |
| | | | | 228/103 |
| 7,132,617 | B2 * | 11/2006 | Lee | B23K 11/24 |
| | | | | 228/103 |
| 8,702,882 | B2 * | 4/2014 | Cai | B29C 66/1122 |
| | | | | 156/367 |
| 9,296,062 | B2 * | 3/2016 | Maev | B23K 20/10 |
| 11,195,273 | B2 * | 12/2021 | Braman | G06V 30/19147 |
| 11,553,410 | B2 * | 1/2023 | Chowdhury | H04W 48/16 |
| 2023/0015734 | A1 * | 1/2023 | Årsvold | B23K 9/0953 |

* cited by examiner

COMPREHENSIVE REAL-TIME CHARACTERIZATION OF ULTRASONIC SIGNATURES FROM NONDESTRUCTIVE EVALUATION OF RESISTANCE SPOT WELDING PROCESS USING ARTIFICIAL INTELLIGENCE

BACKGROUND

Artificial intelligence (AI), and particularly the field of AI known as machine learning, has become increasingly employed in a variety of nondestructive evaluation (NDE) tasks. Machine learning is a field of AI concerned with the development of techniques and algorithms to create mathematical models which automatically learn to perform a task through experience with data. Development of AI systems using machine learning requires careful curation of large amounts of exemplary input data, and for some tasks, the corresponding "label" ("target", "annotation") data consisting of all target outputs which the learner is tasked with outputting for each input. Deep learning is a field of machine learning where the mathematical models take the form of deep artificial neural networks (ANNs). ANNs come in a variety of architectures, many of which are conducive to particular tasks or particular input datatypes (e.g. sequences, images, etc.). The present application discloses a process and resultant systems for accurately and comprehensively characterizing ultrasonic signatures from NDE of resistance spot welds in real time, using deep learning. In our scope, we define "real time" as processing an ultrasonic signature before a subsequent such ultrasonic signature is acquired. We define an "ultrasonic signature" to be any number of ultrasonic A-scans arranged in any way (i.e. grouped in space and/or time). An ultrasonic A-scan is a set of voltage measurements of the ultrasonic transducer output to represent the amount of received ultrasonic energy as a function of time. An M-scan is an example of an ultrasonic signature in which A-scans are acquired at a fixed geometric position and arranged together sequentially in time.

Commercial systems for NDE of resistance spot welds using ultrasound have existed for over a decade and have seen increasing use in manufacturing. Prior related art involving NDE of resistance spot welds are different in scope in that a) the NDE is conducted using methods other than ultrasound (e.g. measuring indirect indicators of weld quality such as resistivity throughout the welding process) b) the NDE data are not acquired during the welding process (i.e. the NDE data are acquired after the resistance spot weld is complete) c) the NDE data are acquired in real time but are not subject to automated or real-time computer-aided analyses (i.e. the NDE data are acquired and stored, and potentially used for manual inspection by human or downstream offline computational analysis), d) real-time computer-aided analyses of the NDE data use relatively simple rules that are manually coded, not comprehensive decisions that are automatically extracted through experience with the NDE data (e.g. via machine learning, deep learning, or any other such approach for big data analysis) or e) any combination of a-d above.

SUMMARY

An AI process and system provide real-time in-process characterization of ultrasonic data from resistance spot welding and real-time post-process characterization of ultrasonic data from resistance spot welding The required subsystems (e.g. data management, data manipulation) for development of these systems are also disclosed.

The AI system for in-process characterization takes as input an ultrasonic signature from any time point in the weld process (i.e., the welding process may not yet be complete thus the system has a more limited view of the welding process) while the post-process characterization system has an ultrasonic signature containing information throughout the entirety of the weld duration and may also contain ultrasonic data from before and after the weld. Further, the AI system for in-process characterization is subject to different computational time constraints than the post-process system. Thus, the AI system for post-process characterization may perform more rigorous characterization than the in-process system and may take advantage of more computationally-intensive forms of AI so as to enhance performance.

In several disclosed embodiments, systems for real-time characterization of ultrasonic NDE signatures from the resistance spot welding process, system for large-scale ultrasonic signature data storage and manipulation, a method for resistance spot weld fabrication for collection of ultrasonic signature data, corresponding weld metadata, and corresponding ideal evaluations with which to develop mathematical models for characterization of the ultrasonic signatures, and a method for computationally preprocessing ultrasonic signature data such that the data are more conducive to development of an artificial intelligence for automated characterization.

In one embodiment, a system using AI may characterize the following features of an ultrasonic signature acquired in the cross section of the heat-affected zone between the weld electrodes, in real-time and in-process (i.e. during the weld):
  a. the time of onset of weld nugget formation
  b. the time at which the weld nugget penetrates each steel-steel interface
  c. the rate of nugget formation
  d. the time at which the weld nugget saturates
  e. the time at which any incidences of expulsion occur
  f. the rate of nugget solidification
  g. the time at which the weld nugget solidifies
  h. the size of the molten weld nugget
  i. the outer limits of the welded stack
  j. the size of the molten weld nugget as a proportion of stack size
  k. the penetration of the molten weld nugget into each sheet in millimeters.

In one embodiment, a system using AI characterizes the following key features of an ultrasonic signature acquired in the joint, in real-time and post-process (i.e. after the analyzed weld is completed):
  a. the closing of the weld gun electrodes
  b. the onset of welding
  c. the time at which the weld nugget begins to form
  d. the time at which the sheet-sheet interface(s) begin(s) to melts
  e. the time at which the weld nugget penetrates all steel-steel interfaces
  f. the rate of molten nugget growth
  g. the time at which the weld nugget saturates
  h. the time at which expulsion(s) happen(s)
  i. the completion of welding
  j. the rate of molten nugget (molten material region) solidification
  k. the time at which the weld nugget solidifies
  l. opening of the electrodes of the weld gun m. the position of the outermost edges of the weld stack at any point in time
n. the position of the outermost edges of the weld nugget at any point in time
o. measure of indentation depth of the electrodes into the welded sheets
p. measure of electrode cap thickness and condition
q. measure of contact condition
r. measure of magnitude of expulsion.

DETAILED DESCRIPTION

Figure 1:
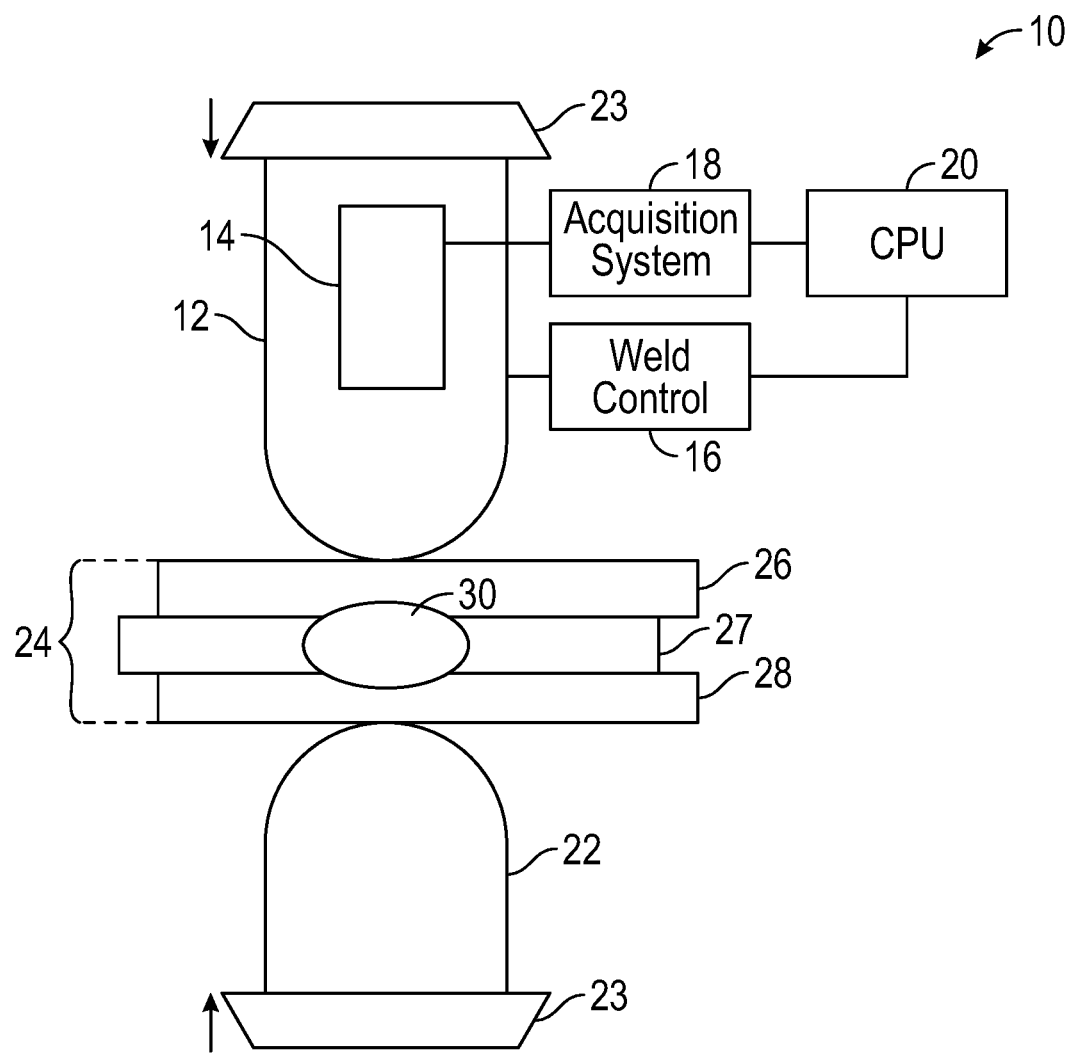
FIG. 1 is a schematic of one example welding system.

FIG. 1 schematically shows a spot-welding system 10 according to one example. The spot-welding system 10 includes a first electrode 12. At least one transducer 14 is mounted within the electrode 12. The transducer 14 may be an ultrasonic transducer.

An ultrasound acquisition system 18 connects to the at least one transducer 14 to pulse and receive sound in a transmission, reflection, or combinational mode of imaging.

A weld controller 16 controls operation of the electrode 12 in a largely known manner A computer 20 controls the ultrasound acquisition system 18 and the weld controller 16. The computer 20 receives the data from transducer 14 and may alter the operation of the weld controller 16 based upon analysis of such data by the computer 20, either during the weld (in-process) or for the next weld (post process).

The computer 20 includes at least one processor and electronic storage (i.e. at least one non-transitory computer-readable media) for storing data and instructions which when executed by the at least one processor performs the functions described herein.

FIG. 1 also shows a second electrode 22 opposite the first electrode 12. The second electrode 22 may also have at least one transducer (not shown) mounted within. Robotic jaws 23 clamp the electrodes 12, 22 together to clamp the stack-up 24 tightly together. The opening and closing of the jaws 23, and optionally the clamping force applied by the jaws 23 via the electrodes 12, 22, is controlled by the weld controller 16. The clamping force may be constant throughout the welding process or alternatively could vary during the welding process, as controlled by the computer 20.

As is known, a stack-up 24 is clamped between the first electrode 12 and the second electrode 22. In this example, the stack-up 24 includes a first workpiece 26, a second workpiece 27, and a third workpiece 28. During the welding process, a liquid weld nugget 30 is formed. The formation, size and location of the liquid weld nugget 30 is measured by the ultrasound waves and monitored over time by the computer 20.

The transducer 14 may transmit ultrasound waves and receive reflections of those ultrasound waves (or pulses of ultrasound) as they encounter the boundaries between the first workpiece 26, the liquid weld nugget 30, the second workpiece 27, and the third workpiece 28.

Figure 2:
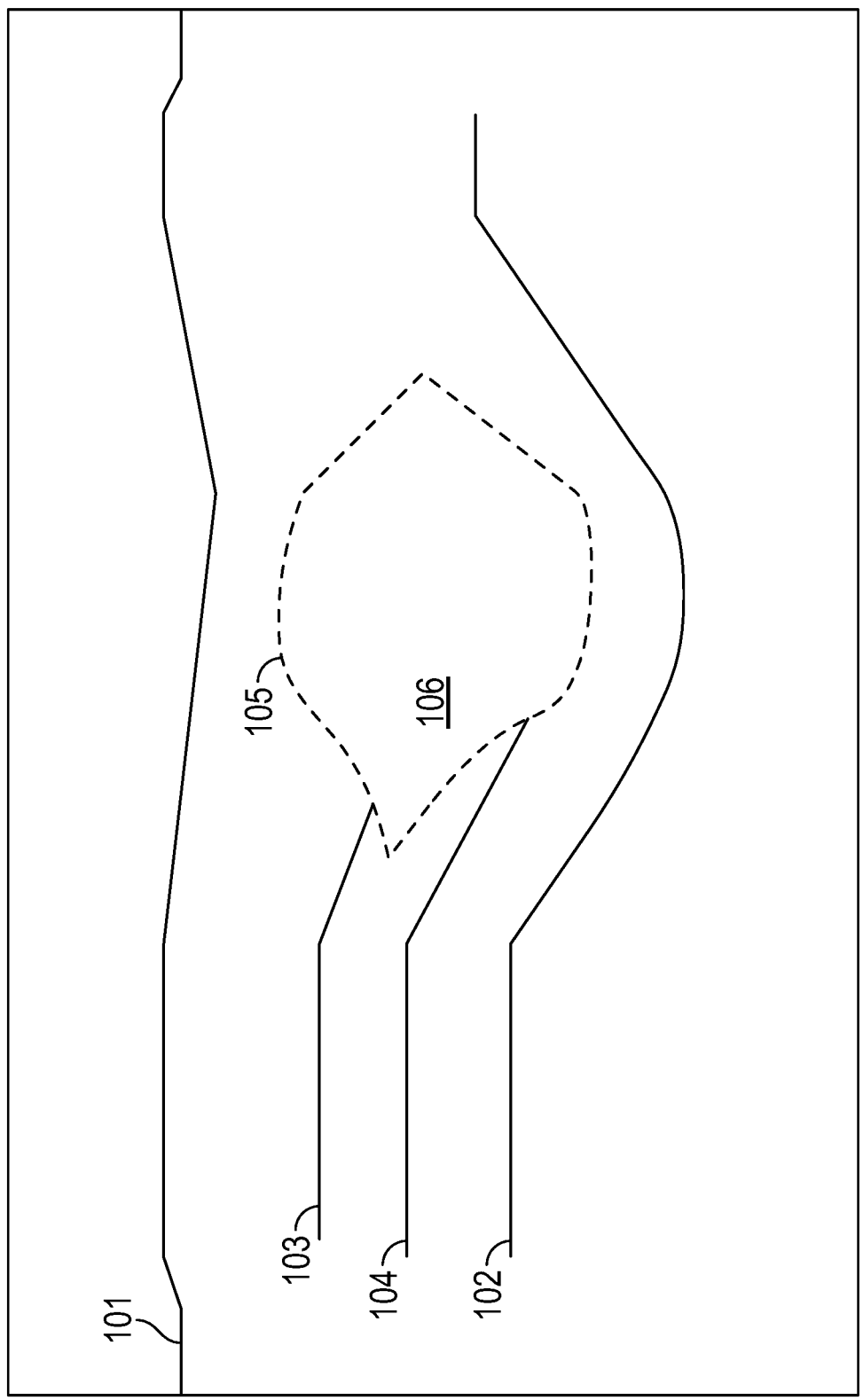
FIG. 2 is an example schematic diagram of a complete ultrasonic signature from a resistance spot weld, as would be obtained using a single-element transducer aiming through the cross section of the welded zone.

FIG. 2 is an example schematic diagram of a complete ultrasonic signature that could be received from the resistance spot weld of FIG. 1, as would be obtained using the transducer 14 (in this example, there is only one transducer 14 for simplicity) aiming through the cross section of the welded zone. The example is not limiting in nature but instead used for simplicity of visualization (other ultrasonic arrangements could yield 3D or 4D signatures which are not as easily visualized). In the example, the horizontal component of the image is welding time, progressing from left to right, and at each position in time a corresponding A-scan signature exists to compose the resultant bitmap. In the example, signature acquisition started before the weld gun electrodes 12, 28 have closed on the stack-up 24 and ended after the weld gun electrodes 12, 28 have released the welded stack-up 24, and the transducer 14 is configured to yield an image focused on the welded stack-up 24. The schematic shows weld formation between three sheets of steel (workpieces 26, 27, 28). The following properties of the welded region are visible in the schematic:

101. the interface between the cap on the welding electrode on the same side of the welded stack as the ultrasonic transducer and the welded sheet closest to the ultrasonic transducer
102. the interface between the cap on the welding electrode opposite to the ultrasonic transducer and the welded sheet farthest from the ultrasonic transducer
103. the interface between the top sheet and central sheet
104. the interface between the central sheet and bottom sheet
105. the top of the molten weld nugget (dashed line)
106. the bottom of the molten weld nugget (dashed line)

Figure 3:
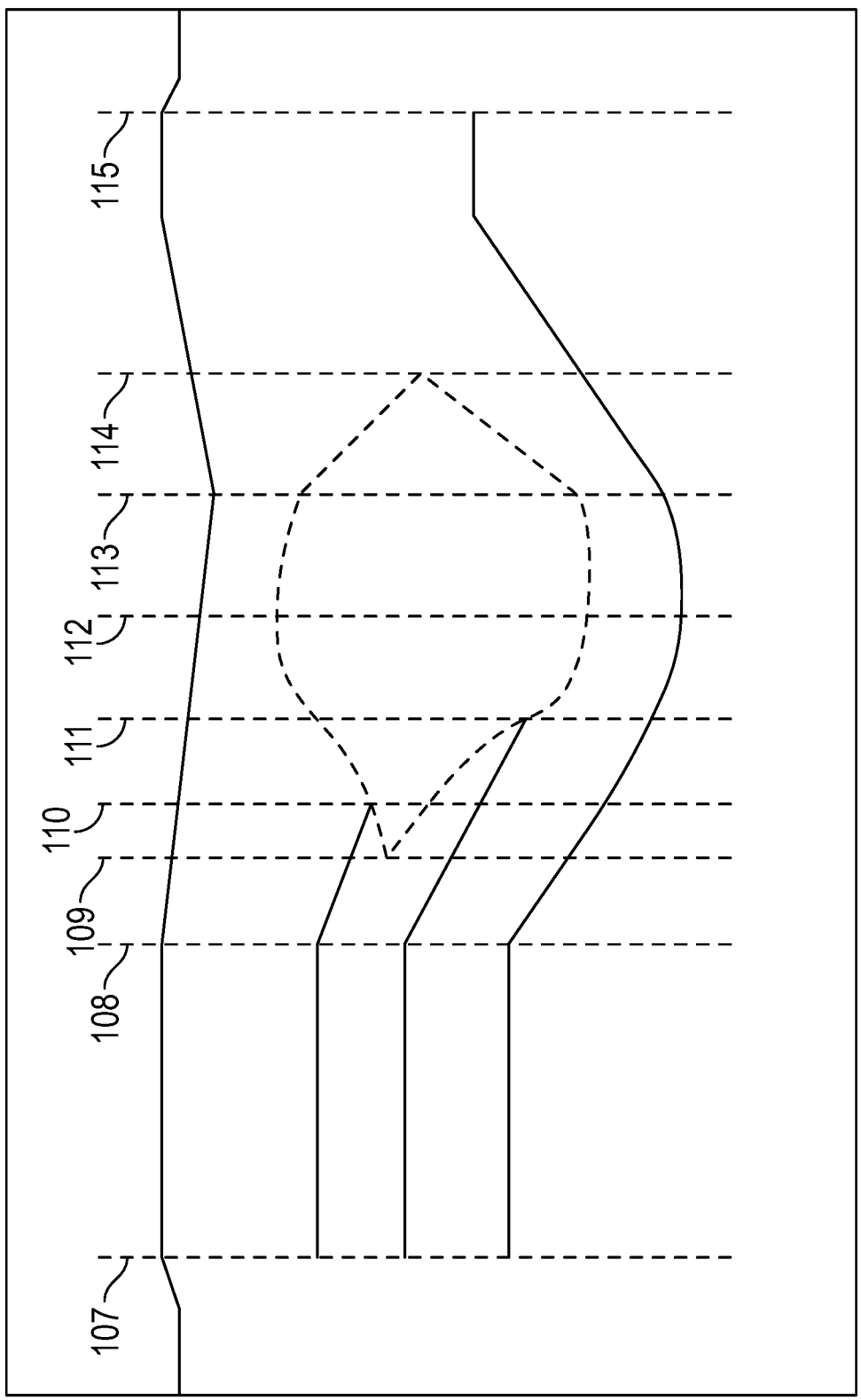
FIG. 3 shows the schematic of the ultrasonic signature of FIG. 2, marked with ultrasonically-measurable key points in time of the resistance spot welding process.
Figure 4:
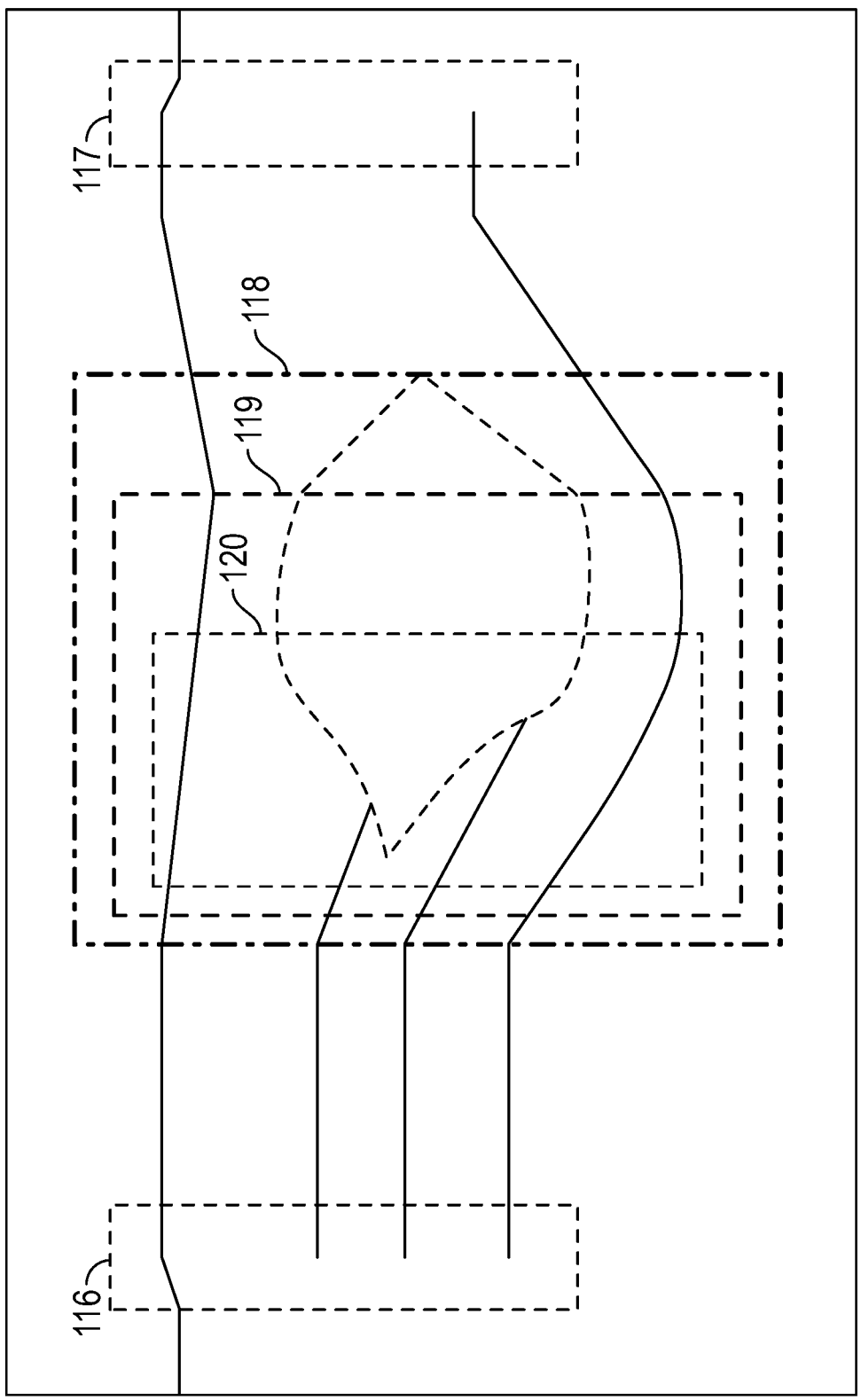
FIG. 4 shows the schematic of the ultrasonic signature of FIG. 2, marked with additional ultrasonically-measurable properties of the resistance spot welding process.

FIG. 3 is the same schematic of an ultrasonic signature as in FIG. 2, marked with the following ultrasonically-measurable key points in time of the resistance spot welding process:

107. time of closing of the weld gun electrodes onto the welded stack
108. time at which welding current is activated
109. onset of weld nugget formation
110. time at which the interface between top sheet and central sheet is penetrated by molten nugget
111. time at which the interface between central sheet and bottom sheet is penetrated by molten nugget
112. time at which nugget saturates (ceases to grow larger)
113. time at which welding current is deactivated
114. time at which nugget solidification occurs 115. time of opening of the weld gun electrodes, releasing the welded stack FIG. 4 is the same schematic of an ultrasonic signature as in FIG. 2, marked with the following ultrasonically-measurable properties of the resistance spot welding process, each tightly enveloped by a bounding box (the example is not limiting in nature and simplified for illustration):

116. weld gun electrodes closing onto the welded stack
117. weld gun electrodes opening to release the welded stack
118. maximum thickness of outermost interfaces from beginning of current activation until nugget solidification (thick dotted box)
119. maximum thickness of outermost interfaces from beginning of current activation until current deactivation (medium dotted box)
120. maximum thickness of outermost interfaces from beginning of current activation until nugget saturation (thin dotted box)

Figure 5:
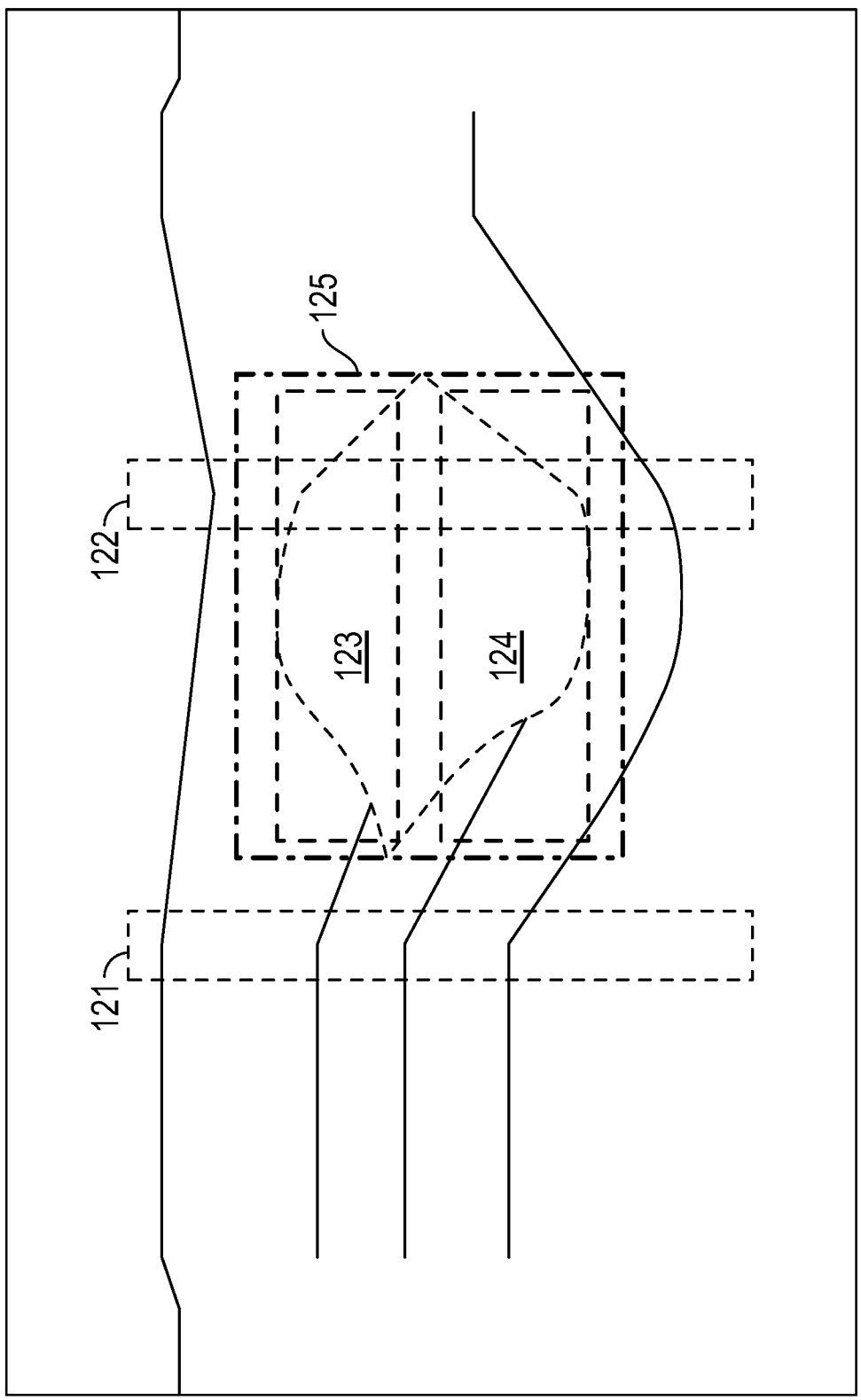
FIG. 5 shows the schematic of the ultrasonic signature of FIG. 2, marked with additional ultrasonically-measurable properties of the resistance spot welding process.

FIG. 5 is the same schematic of an ultrasonic signature as in FIG. 2, marked with the following ultrasonically-measurable properties of the resistance spot welding process, each tightly enveloped by a bounding box (the example is not limiting in nature and simplified for illustration):

121. activation of current
122. deactivation of current
123. weld nugget top half from formation until solidification (upper thin dotted box)
124. weld nugget bottom half from formation until solidification (lower thin dotted box)
125. whole weld nugget, from formation until solidification (thick dotted box)

Figure 6:
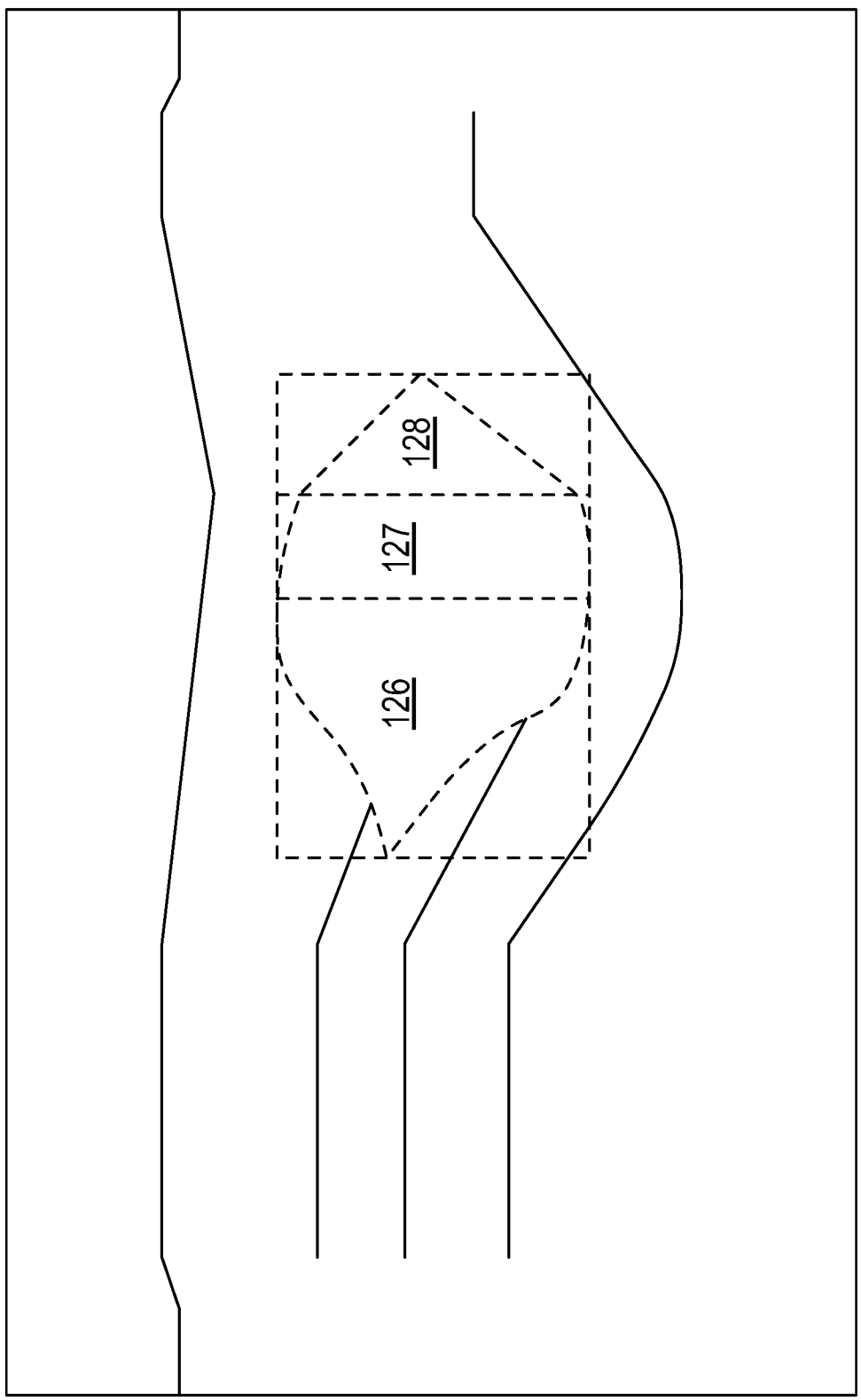
FIG. 6 shows the schematic of the ultrasonic signature of FIG. 2, marked with additional ultrasonically-measurable properties of the resistance spot welding process.

FIG. 6 is the same schematic of an ultrasonic signature as in FIG. 2, marked with the following ultrasonically-measurable properties of the resistance spot welding process, each tightly enveloped by a bounding box (the example is not limiting in nature and simplified for illustration):

126. nugget formation phase (leftmost thin dotted box)
127. nugget saturation phase (central thin dotted box)
128. nugget solidification phase (rightmost thin dotted box)

Figure 7:
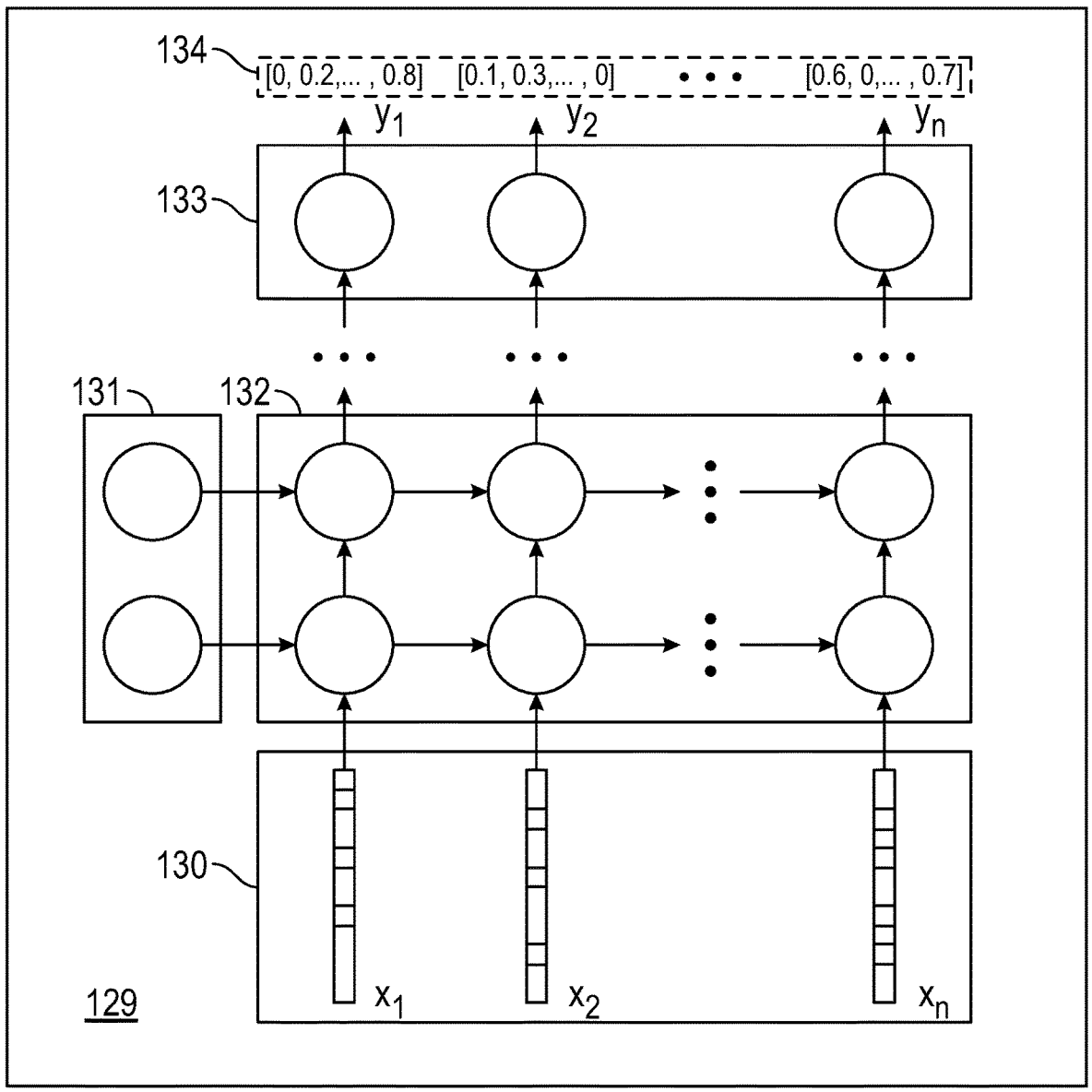
FIG. 7 is a schematic of an exemplary embodiment of an AI model for in-process characterization of ultrasonic NDE data.

FIG. 7 is a schematic of an exemplary embodiment of an AI model 129 for in-process characterization of ultrasonic NDE data such as that produced by the transducer 14 of FIG. 1, such as that shown in FIGS. 2 to 6. The AI model 129 (a machine learning model) would be stored and operated by computer 20 of FIG. 1. In this example, the machine learning model is a recurrent neural network 129 using convolutional long short-term memory layers with a decision-making layer 133 that produces a corresponding output 134 for every time-step of the sequential input. Other types of machine learning models could be used, and the machine learning model could consist of multiple machine learning submodels.

Inputs 130 are shown at the bottom of the schematic— preprocessed ultrasonic A-scans $x_1 \ldots x_n$—and data flows through the model bottom-to-top (with subsequent model layers) and left-to-right (with each time-slice of the input sequence). Circles represent model states for the various layers of the model, and arrows represent various operations on the model state data which transform the internal states, ultimately influencing the model's outputs. The final outputs 134 of the model are used to infer weld quality while the weld is unfolding. The following is visible in the schematic:

129. A recurrent neural network for in-process characterization of ultrasonic NDE data from resistance spot welding
130. The input sequence x of length n—e.g. ultrasonic NDE data sampled at a high frequency during the weld process (e.g. FIGS. 2-6), with each time-slice enumerated $x_1 \ldots x_n$, which was potentially subject to some preprocessing
131. Initial hidden states of the model's recurrent layers
132. Hidden states of the model's recurrent layers while processing input sequence x
133. Decision layer of the network, which takes as input the outputs of the deepest recurrent layer and outputs sequence y, also of length n, wherein each element consists of a vector of real numbers that encode properties of interest (e.g. occurrence of key events, measurements of key features, etc.) in the ultrasonic data
134. Output sequence y In operation, the computer 20 (FIG. 1) monitors the weld process in real time and may alter commands to the weld controller 16 during the weld process based upon the output sequence y 134, e.g. increasing applied current, decreasing applied current, increasing a planned time to apply the applied current, or decreasing the planned time to apply the applied current. Alternatively, depending upon the output sequence y 134, the computer 20 may determine that the weld caps should be replaced, other maintenance should be performed, or that the weld is not salvageable and the stack-up should be further inspected, repaired or discarded.

Figure 8:
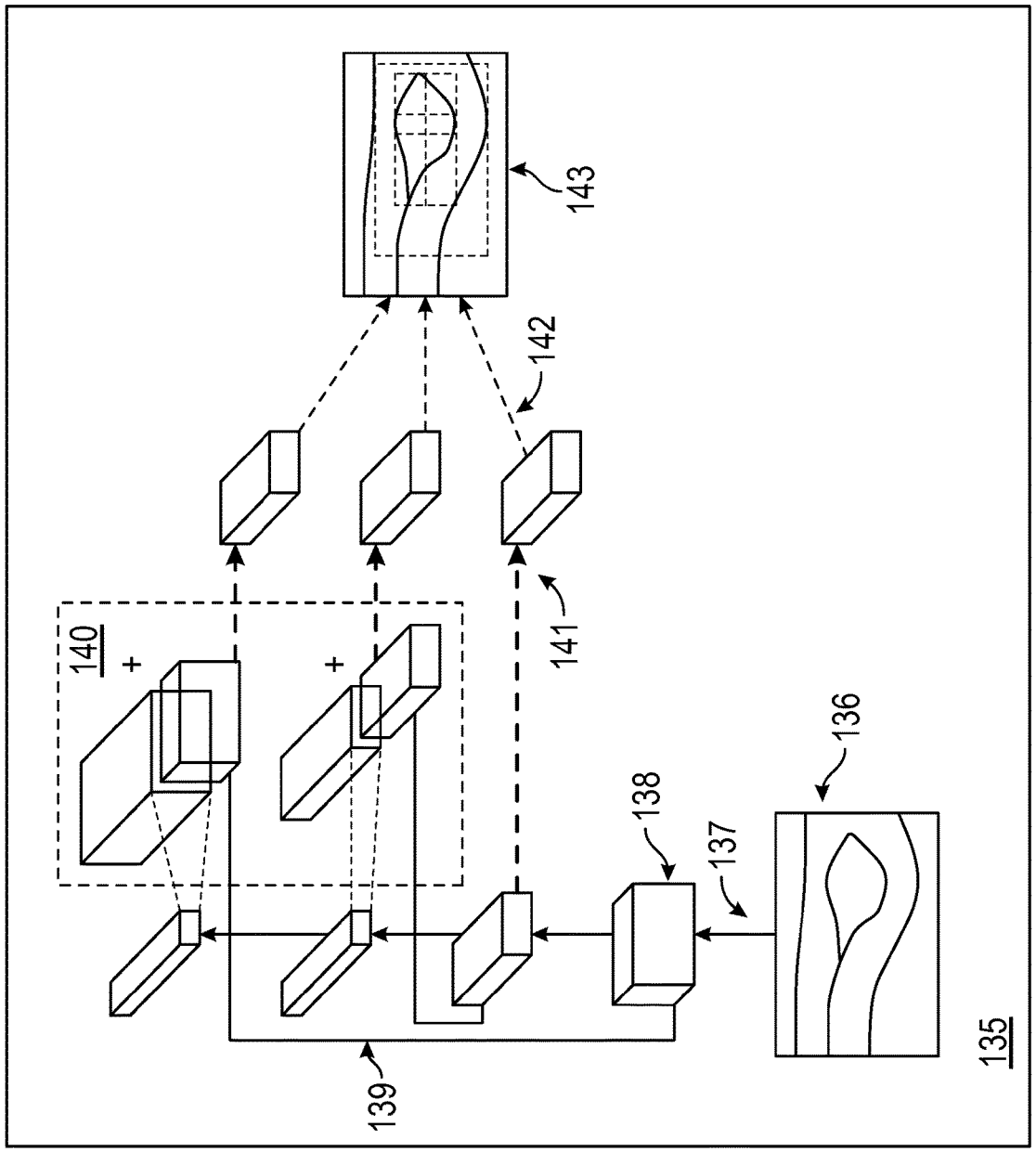
FIG. 8 is a schematic of an exemplary embodiment of an AI model for post-process characterization of ultrasonic NDE data.

FIG. 8 is a schematic of an exemplary embodiment of an AI model 135 for post-process characterization of ultrasonic NDE data 136 such as that produced by the transducer 14 of FIG. 1, such as that shown in FIGS. 2 to 6. The AI model 135 in this example is a machine learning model that is stored and operated by computer 20 of FIG. 1. In this example, the machine learning model is a convolutional neural network model using an object detection approach (though other approaches could be taken, e.g. semantic image segmentation). Other types of machine learning models could be used, and the machine learning model could consist of multiple machine learning submodels.

Figure 9:
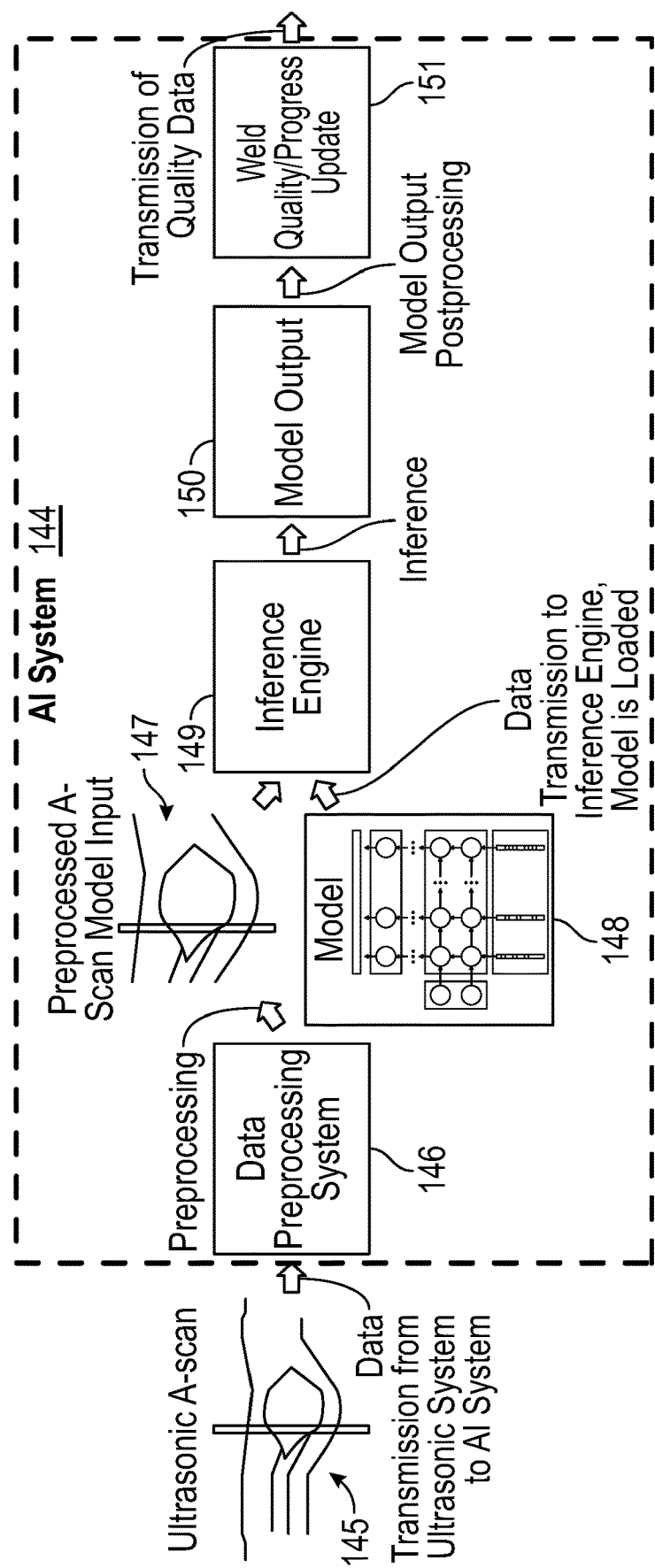
FIG. 9 is a schematic of an exemplary AI system for in-process real-time weld characterization.
Figure 10:
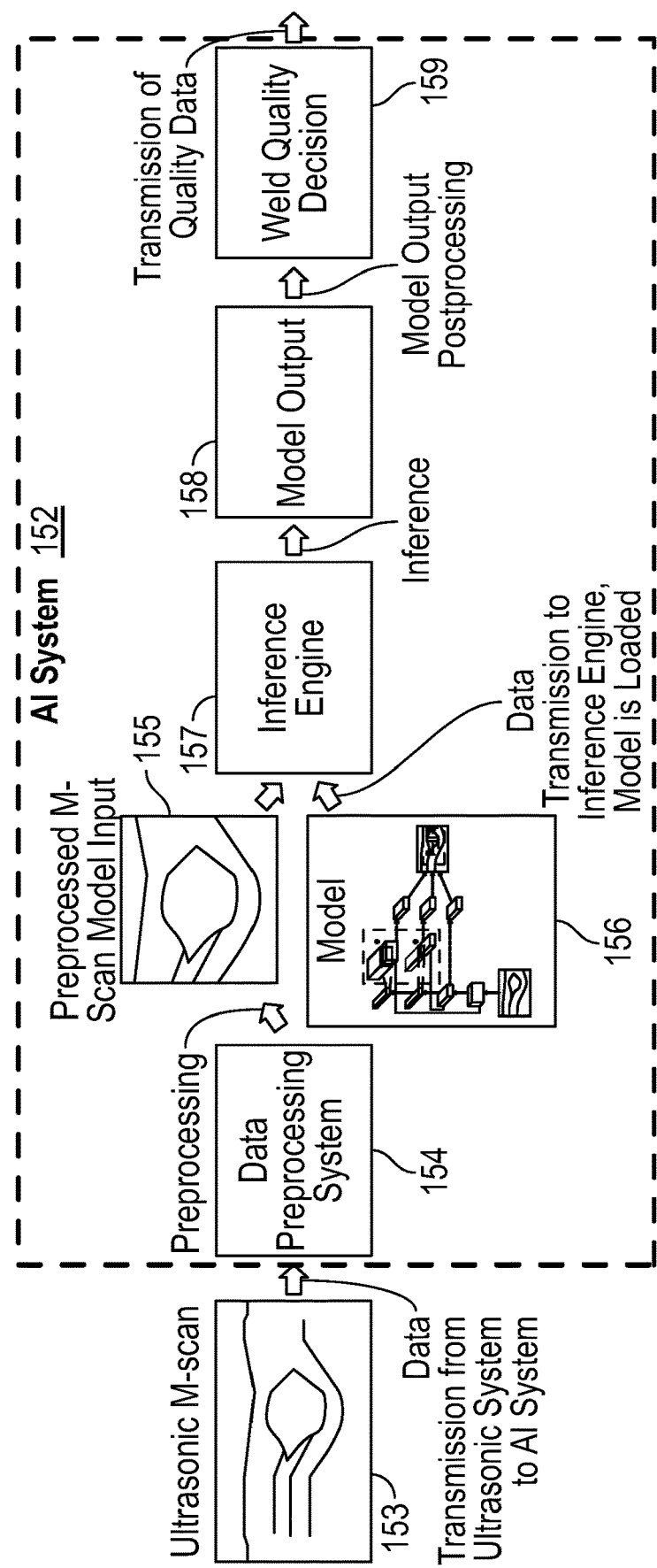
FIG. 10 is a schematic of an exemplary AI system for post-process real-time weld characterization.

The network takes as input a preprocessed ultrasonic M-scan 136, shown at the bottom of the schematic. The network transforms the input image using a variety of potential operations 137 including but not limited to pooling, convolutions, batch normalization, convolutional attention, and dropout (solid arrows). Intermediate internal representations 138 of the input data are shown as image volumes with varying dimensionality, typically becoming deeper with increasing network depth. The network may contain upsampling operations 139 with concatenation operations 140 (+) to combine outputs of different layers at different scales, a technique which has generally been shown to improve performance in convolutional neural networks. Output channels 141 (thick dotted arrows) of the network consist of convolutional neural subnetworks, each with output vectors encoding the positions of bounding box positions, object probability scores, and class probability scores for each of the potential class labels for the proposed bounding boxes. Finally, some potential network output postprocessing 142 may occur (thin dotted arrows), e.g. non-maximum suppression, aggregation of bounding boxes (e.g. nugget boxes and stack outer boxes), bounding box rescaling, etc. Final outputs 143 are used to infer weld quality. The following is visible in the schematic:

135. a convolutional neural network for detection of ultrasonic characteristics using an object detection approach
136. an input ultrasonic M-scan image, which was potentially subject to preprocessing 137. data transformations using a variety of operations such as convolutions, pooling, batch normalization, convolutional attention, etc. (solid arrows throughout diagram
138. intermediate data representations, generally forming image volumes of decreasing height and width, and increasing depth, with increasing network depth
139. skipping operations followed by upsampling of intermediate representations, which allow intermediate representations from different scales to be combined to improve model performance
140. concatenation of various intermediate representations
141. output subnetwork channels (thick dotted arrows)
142. network output postprocessing (thin dotted arrows)
143. resultant output of the process—in this example, bounding boxes which can be used to accurately measure characteristics of the ultrasonic image which allow effective inference of weld quality FIG. 9 is a schematic of an exemplary AI system for in-process real-time weld characterization. The system receives an ultrasonic A-scan 145 from an ultrasonic system such as the transducer 14 of FIG. 1, such as that shown in FIGS. 2 to 6. The AI model would be stored and operated by computer 20 of FIG. 1. A data preprocessing system 146 takes as input the ultrasonic A-scan 145 data on which it performs some set of operations (cropping, rescaling, filtering, etc.) such that it is more conducive to AI-based characterization. It outputs a preprocessed version 147 of the input A-scan on which inference is conducted using some inference engine 149. The inference engine 149, at some point in time, loads a mathematical model 148 which was developed using a machine learning approach. The inference engine 149 takes the preprocessed A-scan 147 as input, pushes the A-scan through the model 148, and outputs raw model output 150. This model output 150 undergoes a postprocessing step such that weld quality or progress 151 can be determined from it. Here, the ultrasonically-measured properties identified by the AI, including time-domain process events and feature occurrences/positions, are used to compute geometric measurements of the observed welding process and resultant physical weld nugget. This may, for example, involve checking if model output values reached critical thresholds, transformation of coordinates from image space to the coordinate system of the welded stack, or checks for presence or absence of key features or events. Finally, weld quality or progress information is then reported outside of the AI system as necessary (e.g. to the weld gun to control welding or to an interface which commits the quality information to a database for long-term storage). The following is visible in the schematic:

144. the AI system for in-process real-time weld characterization (enclosed in dashed box)
145. an ultrasonic A-scan on which AI-based inference is to be conducted
146. the data preprocessing system
147. the preprocessed version of the input A-scan
148. the mathematical model developed using machine learning
149. the inference engine
150. the output of the model
151. the postprocessed model output, which encodes a weld quality or progress update, along with other relevant AI system outputs, which are used outside of the AI system FIG. 10 is a schematic of an exemplary AI system 152 for post-process real-time weld characterization. The system receives an ultrasonic M-scan 153 from an ultrasonic system such as the transducer 14 of FIG. 1. The AI model would be stored and operated by computer 20 of FIG. 1. A data preprocessing system 154 takes as input the ultrasonic M-scan data 153 on which it performs some set of operations (cropping, rescaling, filtering, etc.) such that it is more conducive to AI-based characterization. It outputs a preprocessed version 155 of the input M-scan 153 on which inference is conducted using some inference engine 157. The inference engine 157, at some point in time, loads a mathematical model 156 which was developed using a machine learning approach. The inference engine 157 takes the preprocessed M-scan 155 as input, pushes the M-scan through the model, and outputs raw model output 158. This model output 158 undergoes a postprocessing step such that weld quality or progress can be determined from it. Here, the ultrasonically-measured properties identified by the AI, including time-domain process events and feature occurrences/positions, are used to compute geometric measurements of the observed welding process and resultant physical weld nugget. This may, for example, involve checking if model output values reached critical thresholds, transformation of coordinates from image space to the coordinate system of the welded stack, or checks for presence or absence of key features or events. Finally, weld quality or progress information is then reported outside of the AI system as necessary (e.g. to an interface which commits the quality information to a database for long-term storage). The following is visible in the schematic:

152. the AI system for post-process real-time weld characterization (enclosed in dashed box)
153. an ultrasonic M-scan on which AI-based inference is to be conducted
154. the data preprocessing system
155. the preprocessed version of the input M-scan
156. the mathematical model developed using machine learning
157. the inference engine
158. the output of the model
159. the postprocessed model output, which encodes a weld quality decision and other relevant AI system outputs which are used outside of the AI system The present disclosure includes AI systems for characterization of ultrasonic signatures from resistance spot welds. Pertaining to the development of such systems, the disclosure includes a data management system for storage and manipulation of a collection of ultrasonic signature data from resistance spot welds, corresponding metadata, and the ideal evaluation of the ultrasonic signatures which is required for model training (hereby referred to as the "labels"). The ultrasonic signatures may be, for example and not limited to: a single ultrasonic A-scan signal obtained from a single-element or multi-element ultrasonic transducer aiming through the cross section of the welded region (approximately perpendicular to the surface of the welded sheet) at any point in time throughout or after the welding process, a 2D ultrasonic M-scan image collected from a single-element or multi-element ultrasonic transducer which has a fixed position aiming through the cross section of the welded region which is created by sequentially stacking subsequent A-scans to form a two-dimensional bitmap, a 2D or 3D ultrasonic M-scan image obtained from multi-element transducers arranged linearly or in a matrix at any point in time throughout or after the welding process, or a 3D or 4D set of ultrasonic M-scans composing a "video" by spatially arranging parallel M-scans. The corresponding metadata may include but is not limited to: a unique weld signature ID within the data management system, a weld ID assigned by the welding system, the time at which the welding process began, the thickness of each individual sheet involved in the welded stack, any relevant data pertaining to the collection of ultrasonic data (e.g. ultrasonic sampling rate), an ID for the robot responsible for creating the weld and any other information pertaining to the welding robot, an ID for the welding gun and any other information pertaining to the welding gun, any information pertaining to the welded part e.g. part identifier or VIN number of the vehicle to which the part belongs, and any other relevant resistance spot welding parameters (e.g. weld duration, current, etc.).

Referring to FIG. 2, the corresponding labels for the development of AI systems include, but are not limited to, the following ultrasonically-measurable properties of the resistance spot welding process per ultrasonic signature: the position in time at which the electrodes of the welding gun closed on the welded stack 107, the position in time at which the electrodes of the welding gun released the welded stack 115, the position in time at which the welding current was activated 108, the position in time at which the welding current was deactivated 113, the position in time in the ultrasonic signature at which molten nugget formation began within the welded stack 109, the position in time at which the molten nugget penetrated each sheet in the welded stack in the ultrasonic signature 110, 111, the position in time at which the molten nugget reached saturation (i.e. ceased to grow further) in the ultrasonic signature (e.g. vertically within the welded stack's cross-section) 112, the position in time at which the molten nugget completely solidified in the ultrasonic signature 114, the positions of all steel-steel interfaces (103, 1044) throughout the welded stack in the ultrasonic signature, the positions of the outermost interfaces (101, 102) of the welded stack in the ultrasonic signature (e.g. outer interfaces between the welded stack and welding electrode caps) at any point in time, the positions of the top and bottom of the molten nugget in the ultrasonic signature at any point in time (105, 106), rate of liquid nugget thickness growth (derived from 105, 106, 109, 112), rate of liquid nugget solidification (derived from 105, 1066, 113, 114), exact moment(s) of expulsion event(s), and the degree of electrode indentation into the welded sheets.

Such a data management system may use or include, but is not limited to: a database management system which manages one or more databases containing the aforementioned data, a locally- and remotely-accessible system for adding/removing/manipulating the data, a locally- and remotely-accessible system for manipulating data labels using a graphical user interface which displays ultrasonic signatures and superimposes data labels onto them, and all necessary computer hardware for hosting and using such a system. Such a data management system may be directly connected to local or remote sources and configured for automatic extraction of novel data (e.g. from production environments or research facilities) for immediate incorporation into novel artificial intelligence systems.

Pertaining to the development of the artificial intelligence systems, the disclosure includes a dataset on which to develop the AI systems (hereby referred to as "training dataset"). The training dataset has sufficient coverage of the space of possible weld sheet combinations, weld durations, and weld quality which are observed in practice, so as to yield performant and generalizable mathematical models. Based on observations from industry practices, the training dataset may contain ultrasonic signatures, corresponding metadata, and corresponding weld labels for any number of welds of any conceivable combination of welded sheet thicknesses, number of sheets, weld duration, and weld nugget size.

An exemplary embodiment of an AI system for in-process ultrasonic signature characterization may include a data preprocessing pipeline, a mathematical model, an inference engine, and a model output postprocessing pipeline. Such an AI system takes as input one or more ultrasonic signatures of an ongoing or completed resistance spot weld and outputs one or more numerical vectors which contain encoded information relating to the quality of the analyzed weld. An exemplary embodiment of a data preprocessing pipeline may include, but is not limited to, the following operations on an ultrasonic signature: cropping, rescaling, resampling, Hilbert transform, signal spectrum and phase alteration by different filters, horizontal filtering, symmetrization of the scan with respect to faying interface(s), standardization within a signature or based on a set of signatures, or normalization based on a specific feature of a signature or within a signature or a set of signatures. However, minimal data preprocessing is preferable to relieve computational expense and minimal preprocessing requirements is a key feature of an exemplary embodiment of such an AI system for in-process ultrasonic signature characterization.

An exemplary embodiment of a mathematical model may include any number of fully-connected ANNs, convolutional neural networks (or any variants thereof), recurrent neural networks (or any variants thereof), transformers (or any variants thereof), or any combination thereof, but is not limited to the above-mentioned neural architectures due to the rapid advancement of the field of artificial intelligence.

Such a mathematical model for in-process ultrasonic signature characterization may be trained using a dataset such as that mentioned above so as to create a performant, generalizable mathematical model. An exemplary embodiment of such a mathematical model may be designed and optimized (i.e. "trained" or "taught") to conduct tasks, including but not limited to, identification of the following features in a partial or complete ultrasonic signature of a resistance spot weld: time of onset of weld nugget formation, time at which each steel-steel interface has been penetrated by molten weld nugget, time at which the weld nugget saturates i.e. ceases to grow further, time at which any expulsion incidences occur, time at which the weld nugget solidifies, and the size of the molten weld nugget in the ultrasonic signature.

An exemplary embodiment of an AI model 129 for in-process ultrasonic signature characterization (e.g. FIG. 7) may take as input a sequence of ultrasonic A-scans, e.g. from a single-element ultrasonic transducer sampling at a high rate (e.g. every millisecond), forming a time-series representing the welding process as it unfolds 130. The AI model 129 may take the form of a recurrent neural network, which is a specialized neural architecture for processing sequential inputs because each recurrent layer of the network holds an internal state which is potentially modified as each time-slice of the input sequence is processed. Initial hidden states 131 of the model's recurrent layers 132 may be initialized to an arbitrary value e.g. zero. The recurrent layers 132 of the network may take the form of 1D convolutional long short-term memory units (LSTM), which are specialized gated units capable of preserving and understanding the spatial relationships within each time-slice of the input sequence. Convolutional LSTM units are also beneficial because they are extremely fast and effective for processing inputs with spatial relationships (such as ultrasonic A-scans). There may be one or more such recurrent layers in the network, which may also benefit from classical regularization strategies such as dropout. Between convolutional LSTM layers there may also be maximum-pooling layers which reduces the size of the input before computing the relatively time-consuming convolution operations. Finally, after some number of recurrent layers, the architecture may have any number of time-distributed decision layers 133, allowing the network to provide an assessment of each individual time-slice, which may take the form of e.g. a fully-connected layer with linear or sigmoidal activation functions as necessary for the specific task of the network. The resultant output 134 consists of a sequence of vectors of real numbers which encode the state of the weld, e.g. occurrence of key events (e.g. 109-112), measurements of key features in the ultrasonic data, presence of non-conformities e.g. expulsions, positions of key features in the input A-scan, etc. In terms of real-timeliness, such a model produces an output $y_t$ for input time-slice $x_t$ before receiving input time-slice $x_{t+1}$.

An exemplary embodiment of a model output postprocessing pipeline may include, but is not limited to, the following operations on raw output data from the aforementioned mathematical model: normalization, rescaling (e.g. in the space of the ultrasonic signature or in time), elimination (e.g. ignoring particular outputs based on pre-defined thresholds), aggregation within a single model or across an ensemble of models (i.e. to ensure final outputs are consistent across all models in an ensemble), or conversion to real-world measurements (e.g. from pixels in a 2D image representation to physical measurement based on mathematical relationships known a priori). The aforementioned data preprocessing pipeline, mathematical model, inference engine, and model output postprocessing may be encoded into software written in programming languages including but not limited to Python, C, C++, and Julia.

As a complete example of an AI system for in-process weld characterization 144, consider an ultrasonic system that produces an A-scan 145 signature once every millisecond, throughout the welding process. The ultrasonic system transmits the ultrasonic A-scan 145 signature to a data preprocessing system 146 which is running on another process. Some weld information such as welding schedule, welded stack sheet combination, welded materials, etc. may be known a priori. The data preprocessing system 146 crops the A-scan 145 to a relevant region, focusing on the space within the welded stack 24 after the welding current has been activated using the a priori knowledge for the weld, rescales the A-scan signal amplitude information to values between −1 and 1, and rescales the cropped A-scan to a vector of length 128 elements. This preprocessed A-scan 147 from time-step t, which will be used as AI model 148 input, is denoted $x_t$. At some point in time prior to the current weld, an inference engine loaded a mathematical model 148 which has already been trained for a particular task using a supervised deep learning approach. The model 148 for instance is a convolutional LSTM trained to identify four key events (nugget formation, final steel-steel interface disappearance, nugget vertical saturation, and incident of first expulsion). There are many potential ways to model key event detection, but a particular approach is presented as an example. Each key event is assigned a particular index of a four-element vector $y_t$ which is produced by the model every time-step (i.e. for every model input A-scan $x_t$). The occurrence of a key event, e.g. nugget formation assigned to index 0 (i.e. $y_t[0]$), may be encoded as 0 prior to event occurrence and 1 thereafter. During model training, the ultrasonic signature dataset would necessarily also be labelled in this manner so as to allow the model to learn the relationship between some particular patterns in a sequence of A-scans and the occurrence of a given event, using a supervised deep learning approach. Throughout the weld process, the inference engine 149 continues to receive new preprocessed A-scans ($x_1, x_2, x_3, \ldots, x_n$) and pushes each one into the loaded model to produce corresponding model outputs ($y_1, y_2, y_3, \ldots, y_n$). Each model output $y_t$ is subject to postprocessing, in this case a simple thresholding mechanism that considers an event at index k to have occurred if $y_t[k]>0.5$. Then, the occurrence (or lack thereof) is reported externally.

In this case, as the model is taking as input preprocessed A-scans of length 128, a suitable model architecture reaching the required performance and inference time requirements (assuming sufficient training data) within the given real-time time constraints would be a convolutional LSTM described as follows. Speaking in terms of increasing network depth, model has a convolutional LSTM layer which performs a padded 1D convolution (with 16 filters of size 3 with tanh activation) over the A-scan, followed by maximum pooling to reduce the size of the internal representation to 64, followed by dropout with dropout probability of 0.3, followed by another convolutional LSTM layer performing a padded 1D convolution (32 filters of size 3 with tanh activation), followed by another maximum pooling to reduce the size of the internal representation to 32, followed by another dropout with dropout probability of 0.3, followed by another convolutional LSTM layer performing a padded 1D convolution (64 filter of size 3 with tanh activation), followed by another maximum pooling to reduce the size of the internal representation to 16, followed by another dropout with dropout probability of 0.3. Finally, this 16×64 tensor is flattened into a vector of 1024 elements, which is used as input into a time-distributed fully-connected output layer with 4 units (one for each model output) which uses sigmoidal activation (as the required model outputs are between 0 and 1. As the model is a convolutional LSTM, the convolution operation at layer depth d at time-step t $o_{dt}$ produces internal state tensors $h_{dt}$ and $c_{dt}$ that are also passed and similarly modified in time. Such internal states can be initialized to 0 when beginning characterization of each new weld so as to clear the model's internal states (its "memory").

Similar to the above-mentioned AI system for in-process ultrasonic signature characterization, an exemplary embodiment of an AI system for post-process ultrasonic signature characterization includes a data preprocessing pipeline, a mathematical model, an inference engine, and a model output postprocessing pipeline. Such an AI system takes as input one or more ultrasonic signatures of a completed resistance spot weld and outputs one or more numerical matrices which contain encoded information relating to the quality of the analyzed weld. The data preprocessing pipeline, inference engine, and model output postprocessing pipeline for an AI system for post-process ultrasonic signature characterization may be similar to those mentioned above for in-process characterization.

An exemplary embodiment of an AI model 135 for post-process ultrasonic signature characterization (e.g. FIG. 8) may take as input an ultrasonic M-scan 136 created by horizontally stacking ultrasonic A-scans gathered over the welding process e.g. from a single-element ultrasonic transducer sampling at a high rate (e.g. every millisecond), forming a 2D image which represents the entirety of the welding process. The image may or may not be subject to some preprocessing (e.g. cropping, Hilbert transform, etc.). The model may take the form of a convolutional neural network, which is a specialized neural architecture for processing data with spatial relationships as it learns in each convolutional layer a set of multidimensional filters with which to transform the input volumes via a discrete convolution. Successive convolution, pooling, batch normalization, dropout, and other such operations 137 are performed, yielding intermediate representations of the input forming image volumes 138 throughout the network. Skip connections 139 may be used in the network to allow the combination of differently-scaled intermediate representations using upsampling and concatenation 140, as well as other specialized subnetworks such as convolutional attention blocks which allow such networks to "pay attention" to specific parts of the intermediate data. Output channel subnetworks 141 continue to process the data at multiple scales, the results of which are image volumes containing encoded bounding box edge data and corresponding object and class probability scores. After some postprocessing of these data volumes 142, the resultant output 143 consists of an array of vectors of real numbers which describe the positions and characteristics of all the detected bounding boxes in the input image. As more time is available for post-process evaluation, an AI model for post-process characterization may be designed and optimized to conduct more rigorous analyses of the ultrasonic data, conducting tasks including but not limited to, identification of the following features in a complete ultrasonic signature of a resistance spot weld: the moment at which weld gun electrodes close onto the welded stack 107, the onset of welding 108, onset of weld nugget formation 109, time at which each steel-steel interface has been penetrated by molten weld nugget (110, 111), rate of nugget growth (derived from 105, 106, 109, 112), time at which the weld nugget saturates 112, time at which any expulsion incidences occur, the completion of welding 113, rate of nugget solidification (derived from 105, 106, 113, 114), the time at which the weld nugget solidifies 114, degree of electrode indentation into the welded sheets, the moment at which weld gun electrodes release the welded stack, the position of the outermost edges of the welded stack at any point in time, and the position of the outermost edges of the weld nugget at any point in time.

Referring to FIG. 10, as a complete example of an AI system 152 for post-process weld characterization consider an ultrasonic system that produces an A-scan signature once every millisecond, throughout the welding process. The ultrasonic system horizontally stacks all A-scans obtained throughout the welding process, including approximately 100 ms worth of A-scans after the welding current has been disabled (i.e. to monitor and ensure weld nugget solidification), forming an ultrasonic M-scan 153 weld signature. The ultrasonic system transmits the ultrasonic M-scan 153 signature to a data preprocessing system 154 which is running on another process. Some weld information such as welding schedule, welded stack sheet combination, welded materials, etc. may be known a priori. The data preprocessing system 154 crops the M-scan 153 to a relevant region, focusing on the space within the welded stack 24 after the welding current has been activated using the a priori knowledge for the weld, rescales the M-scan 153 signal amplitude information to values between 0 and 1, and rescales the cropped M-scan to 256×256 pixels. At some point in time prior to the current weld, an inference engine 157 loaded a mathematical model 156 which has already been trained for a particular task using a supervised deep learning approach. The model 156 for instance is a convolutional neural network trained for object detection, but other approaches could involve e.g. classification, regression, semantic segmentation wherein multiclass classification occurs per image pixel, etc. There are many potential ways to model object detection; for example the model outputs at each position of multi-scale output representations (32×32, 16×16, and 8×8) encoded bounding box coordinates, bounded object class probabilities, and an object probability score. During model training, the ultrasonic signature dataset would necessarily also be labelled with bounding boxes for all possible object classes to allow the network to discover hierarchies of patterns in ultrasonic M-scans that represent objects, using a supervised deep learning approach. With each completed weld, the inference engine 157 receives a new preprocessed M-scan 155 and pushes it into the loaded model 156 to produce corresponding model outputs 158. Model outputs 158 are then subjected to model output postprocessing, which includes non-maximum suppression (eliminating bounding boxes of the same class with sufficient overlap and non-maximum object probability) and an aggregation step (matching expulsion bottoms and tops with each other horizontally, weighted-averaging all nugget boxes to form a singular nugget box, weighted-averaging all vertical positions of outer bounding boxes to form outer box vertical limits). Then, all aggregated boxes are reported externally.

In this example, a mathematical model architecture reaching state-of-the-art performance and inference time appropriate for post-process real-timeliness could be described as show in Table 1. This particular model has 1972828 parameters in total, yielding inference time of approximately 25 milliseconds on CPU. Note that all convolution layers with stride 2 are preceded by a top-left zero padding. In convolution layers, batch normalization precedes activation (e.g. via rectified linear unit, ReLU). For each output layer, three bounding box templates are provided with units of pixels according to preprocessed input size, and varying aspect ratios that are learned from the input dataset. Output vectors for each template have 14 values (amounting to 42 outputs per position per output layer). For output corresponding to each bounding box template, sigmoidal activation is used on indices 0, 1, and 4 (template x position offset, template y position offset, and object probability score), while linear activation is used on indices 2 and 3 (template width modifier and height modifier, accordingly, which are modelled exponentially and then normalized by preprocessed input image size). The remaining 9 indices correspond to class probability vector, which uses softmax activation to produce class probabilities that sum to 1 over the vector. Importantly, during training, for a given position and bounding box template, the learned object probability score is the intersection-over-union of a proposed box and the most closely matching ground truth box. Thus, the model is able to learn (and consequently, appropriately output) when a proposed box likely has strong overlap with a truthful box (i.e., a confident prediction) and when it does not (an unconfident prediction). For a given postprocessed bounding box, the final confidence score associated with the box is the class probability score for the class having highest probability multiplied by the object probability score. Convolutional Block Attention Modules may be implemented in a known manner. In addition to improved performance in terms of detection rates, false positive/negative rates, and localization (e.g. percent error of bounding box edges), using such attention layers allows users to inspect the attention maps to determine where the model is "paying attention" in the original image—that is, it provides a sense of explanation for the model's decisions.

TABLE 1

| Layer Number | Layer Type | Input Layers | Layer Parameters | Output Dimension |
|---|---|---|---|---|
| 1 | Input | M-scan | None | 256×256×1 |
| 2 | Convolution | 1 | Filters 64, stride 1, kernel 3, padding same, batch norm, ReLU | 256×256×64 |
| 3 | Convolution | 2 | Filters 64, stride 2, kernel 3, padding valid, batch norm, ReLU | 128×128×64 |
| 4 | Convolution | 3 | Filters64, kernel 3, stride 1, padding same, batch norm, ReLU | 128×128×64 |
| 5 | Convolution | 4 | Filters 64, kernel 3, stride 2, padding valid, batch norm, ReLU | 64×64×64 |
| 6 | Convolution | 5 | Filters 64, kernel 3, stride 1, padding same, batch norm, ReLU | 64×64×64 |
| 7 | Convolution | 6 | Filters 64, kernel 3, stride 2, padding valid, batch norm, ReLU | 32×32×64 |
| 8 | Convolution | 7 | Filters 64, kernel 3, stride 1, padding same, batch norm, ReLU | 32×32×64 |
| 9 | Convolution | 8 | Filters 128, kernel 3, stride 2, padding valid, batch norm, ReLU | 16×16×128 |
| 10 | Convolution | 9 | Filters 128, kernel 3, stride 1, padding same, batch norm, ReLU | 16×16×128 |
| 11 | Convolution | 10 | Filters 128, kernel 3, stride 2, padding valid, batch norm, ReLU | 8×8×128 |
| 12 | Convolution | 11 | Filters 128, kernel 3, stride 1, padding same, batch norm, ReLU | 8×8×128 |
| 13 | Convolutional Block Attention Module | 12 | Kernel 7, squeeze ratio 0.125 | 8×8×128 |
| 14 | Convolution | 13 | Filters 128, kernel 3, stride 1, padding same, batch norm, Leaky ReLU | 8×8×128 |
| 15 | Convolution | 14 | Filters 42, kernel 1, stride 1, padding same, ReLU | 8×8×42 |
| 16 | Output | 15 | None | 8×8×42 |
| 17 | Convolution | 13 | Filters 128, kernel 1, stride 1, padding same, batch norm, Leaky ReLU | 8×8×128 |
| 18 | Upsampling | 14 | Factor 2 | 16×16×128 |
| 19 | Concatenate | 10, 18 | None | 16×16×256 |
| 20 | Convolution | 19 | Filters 128, kernel 1, stride 1, padding same, batch norm, Leaky ReLU | 256×256×3 |
| 21 | Convolution | 20 | Filters 128, kernel 3, stride 1, padding same, batch norm, Leaky ReLU | 16×16×128 |
| 22 | Convolution | 21 | Filters 128, kernel 1, stride 1, padding same, batch norm, Leaky ReLU | 16×16×128 |
| 23 | Convolution | 22 | Filters 128, kernel 3, stride 1, padding same, batch norm, Leaky ReLU | 16×16×128 |
| 24 | Convolution | 23 | Filters 128, kernel 1, stride 1, padding same, batch norm, Leaky ReLU | 16×16×128 |
| 25 | Convolutional Block Attention Module | 24 | Kernel7, squeeze ratio 0.125 | 16×16×128 |
| 26 | Convolution | 25 | Filters 128, kernel 3, stride 1, padding same, batch norm. Leaky ReLU | 16×16×128 |
| 27 | Convolution | 26 | Filters 42, kernel 1, stride 1, padding same, ReLU | 16×16×42 |
| 28 | Output | 27 | None | 16×16×42 |
| 29 | Convolution | 25 | Filters 128, kernel 1, stride 1, padding same, batch norm, Leaky ReLU | 16×16×128 |
| 30 | Upsampling | 29 | Factor 2 | 32×32×42 |
| 31 | Concatenate | 8, 30 | None | 32×32×192 |
| 32 | Convolutional Block Attention Module | 31 | Kernel 7, squeeze ratio 0.125 | 32×32×192 |
| 33 | Convolution | 32 | Filters 128, kernel 1, stride 1, padding same, batch norm, Leaky ReLU | 32×32×128 |
| 34 | Convolution | 33 | Filters 128, kernel 3, stride 1, padding same, batch norm, Leaky ReLU | 32×32×128 |
| 35 | Convolution | 34 | Filters 128, kernel 1, stride 1, padding same, batch norm, Leaky ReLU | 32×32×128 |

TABLE 1-continued

| Layer Number | Layer Type | Input Layers | Layer Parameters | Output Dimension |
|---|---|---|---|---|
| 36 | Convolution | 35 | Filters 128, kernel 3, stride 1, padding same, batch norm, Leaky ReLU | 32×32×128 |
| 37 | Convolution | 36 | Filters 128, kernel 1, stride 1, padding same, batch norm, Leaky ReLU | 32×32×128 |
| 38 | Convolution | 37 | Filters 128, kernel 3, stride 1, padding same, batch norm, Leaky ReLU | 32×32×128 |
| 39 | Convolution | 38 | Filters 42, kernel 1, stride 1, padding same, ReLU | 32×32×42 |
| 40 | Output | 39 | None | 32×32×42 |

As mentioned previously, a thesis by Zarreen Naowal Reza (2019) describes a similar approach to the problem of automatic real-time post-process characterization of ultrasonic NDE data from resistance spot welding; the work conducted therein was preliminary to the developments disclosed herein. Importantly, there are several key characteristics which separate our developments from the work presented in the thesis. The most performant network presented in the thesis was an 'SSD' single-shot detector which used a pretrained MobileNet subnetwork for feature-extraction, developed using an approach known as "transfer learning" wherein a network or subnetwork trained for some task (in that case, image recognition using the MS COCO dataset) is repurposed for a new task (with potential fine-tuning for the new task). The MobileNet feature-extraction subnetwork has over four million parameters, and the SSD object detection subnetwork has over nine million parameters, yielding a total of over 13 million parameters—the current state-of-the-art model disclosed herein was a custom-designed model trained from scratch which uses fewer than two million parameters in total. Consequently, the inference time of the model proposed in the thesis was 367 milliseconds on CPU, while the approach proposed herein requires 25 milliseconds.

The most performant approach presented in the thesis also required intense data preprocessing, including the use of horizontal filtering and symmetrization which did indeed remove horizontal noise from the image and accentuate the angular patterns comprising the nugget formation and closure stages. However, that preprocessing approach was also detrimental in that it is costly to compute, and more importantly it removes plenty of actionable information from the image which e.g. can be used to estimate nugget size during cases of transducer misalignment where parts of the angular nugget patterns are obfuscated in the image or completely non-existent, or e.g. can be used to identify other important patterns such as discontinuities in the outer interfaces indicative of process non-conformities such as expulsions, or to estimate other properties of the ultrasonic data such as the thickness of the welded stack at time of saturation. As a result, the thesis presents a system that can identify five patterns in the ultrasonic images: nugget growth, nugget solidification, whole nugget, nugget top, and nugget bottom. The method and system disclosed herein for post-process characterization can identify the same five patterns, as well as many others including but not limited to discontinuities in the outer interfaces indicative of expulsions or other process non-conformities (e.g. slipping of the weld electrode caps) and the outermost stack interfaces which are vital to computing the position and penetration of the nugget vertically into the welded stack. Further, the approach disclosed in the thesis required input images to be resized to 100×100, which results in the loss of information. Thus, minimal reduction in M-scan size is preferable. The approach disclosed herein preprocesses images such that they are embedded into a 256×256 square, maintaining higher resolution and thus maintaining more informative features, while still requiring a fraction of the inference time.

In addition, there are several important differences in terms of implementation. Clearly, the networks are completely different in terms of structure as the one disclosed herein uses approximately 15% of the parameters. Both the architecture herein and the MobileNet+SSD approach in the thesis allow detection at different scales. However, as the MobileNet+SSD approach was originally developed for object detection in typical real images with many different types of objects to detect at vastly different scales (e.g. tiny objects in zoomed-out pictures and vice-versa), detection at six scales was necessary for that problem but is unnecessary for the problem of real-time post-process weld characterization (evidenced by the performance of the models). Further, the approach in the thesis uses anchors of fixed sizes. The approach described herein defines 9 bounding box templates, 3 per each output layer, which are learned from training data prior to machine learning (e.g. via statistical analysis or automated clustering). Another key difference is the previously-mentioned use of the convolutional block attention module. A key issue in deep learning is quantifying confidence; directly using the output of softmax layers cannot be interpreted as "confidence" because almost invariably the class probability vectors use one-hot encoding during training (i.e. the vector takes a value of one at the position corresponding to the "correct" class, while all others take a value of zero). Thus, the model learns to push values in the class probability vector to the extreme values of 0 and 1. However, adding the learning step of regressing on IOU with the highest-overlap bounding box (i.e. the learning task for index 4 of the output vector per position per bounding box template) allows the model to more appropriately quantify its prediction confidence. In our approach, the model can propose a relatively poor-quality box (in terms of error of bounding box edges) but consequently output an object probability value of e.g. 0.5 (and even if the class probability for a given class is 1.0, the resultant confidence value will be 0.5) while the approach of the thesis would simply output the 1.0 class probability in the same case.

The approach presented in the thesis leveraged data from only five sheet combinations which limits the breadth of data used not only in model training but also in model validation and testing. As a result, though the model did perform well on data similar to that on which it was trained, the generality of the approach to novel stack combinations was insufficient. The training, validation, and testing datasets used for the methods and systems disclosed herein consist of ultrasonic images from over 20000 welds covering over 50 stack combinations, ranging from 0.55 mm+0.65 mm to 1.8 mm+1.8 mm+1.8 mm and covering the complete spectrum of weld quality (failure to expulsion i.e. over-weld). The present disclosure has seen extremely successful production use and is able to identify and measure the desired ultrasonic characteristics accurately and under an extremely wide variety of conditions (weld quality, weld geometry, weld cap quality, system noise, etc.). Current state-of-the-art results include ~99% detection rate for non-conformities, ~0.98 average precision for outer interfaces, and ~97% detection rate for nugget features, with >0.9 intersection over union on horizontal and vertical image dimensions against ground-truth bounding boxes in testing.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers on method steps do not signify a required sequence of performance of the method steps unless otherwise specifically recited in that claim.

What is claimed is:

1. A resistance spot-welding inspection system comprising:
   at least one processor; and
   at least one non-transitory computer-readable media storing:
      a machine learning model that has been trained using a dataset of a plurality of ultrasonic signatures generated during a plurality of resistance spot weld monitoring processes, wherein each of the plurality of ultrasonic signatures includes an M-scan; and
      instructions that, when executed by the at least one processor, cause the resistance spot-welding inspection system to perform the following operations:
         a) receiving a sampled ultrasonic signature generated during a monitored resistance spot-welding process in which electrodes are applying current based upon commands from a weld controller, wherein the sampled ultrasonic signature includes a sampled M-scan;
         b) using the machine learning model to process the sampled ultrasonic signature;
         c) postprocessing machine learning model output from step b) to assess the monitored resistance spot welding process; and
         d) based upon the assessment of step c), altering the commands from the weld controller during the monitored resistance spot welding process.

2. The system of claim 1 wherein the machine learning model is a recurrent neural network including plurality of recurrent layers.

3. The system of claim 2 wherein the plurality of recurrent layers include a plurality of convolutional long short-term memory units.

4. The system of claim 1 wherein an output of the machine learning model encodes a state of the resistance spot-welding process.

5. The system of claim 1 wherein the machine learning model is a neural network including a plurality of recurrent layers and a plurality of time-distributed decision layers.

6. The system of claim 5 wherein an output of at least one of the plurality of time-distributed decision layers encodes a state of the monitored resistance spot-welding process.

7. The system of claim 1 further including at least one ultrasonic sensor generating the sampled ultrasonic signature received in step a).

8. The system of claim 7 wherein the sampled ultrasonic signature received in step a) is generated during the monitored resistance spot welding process in which the electrodes are applying current and force based upon commands from the weld controller.

9. The system of claim 8 wherein step d) includes altering the commands from the weld controller to regulate the monitored resistance spot welding process.

10. The system of claim 9 wherein the machine learning model includes multiple submodels.

11. A resistance spot-welding inspection system comprising:
    at least one processor; and
    at least one non-transitory computer-readable media storing:
       a machine learning model, that has been trained using a dataset of a plurality of ultrasonic signatures generated during a plurality of resistance spot weld monitoring processes, wherein each of the plurality of ultrasonic signatures includes an M-scan; and
       instructions that, when executed by the at least one processor, cause the resistance spot-welding inspection system to perform the following operations:
          a) receiving a sampled ultrasonic signature generated during a monitored resistance spot welding process, wherein the sampled ultrasonic signature includes a sampled M-scan;
          b) using the machine learning model to process the sampled ultrasonic signature;
          c) evaluating the monitored resistance spot-welding process based upon step b); and
          d) based upon step c), altering commands for the monitored resistance spot welding process or a subsequent resistance spot welding process.

12. The system of claim 11 further including the step of:
    e) based upon step b) identifying key physical measurements of monitored resistance spot-welding process events in the monitored resistance spot-welding process including at least one event selected from a group consisting of: onset of weld nugget, time at which an interface has been penetrated by the weld nugget, rate of weld nugget formation, solidification, and penetration depth into each of a pair of outermost sheets subject to the monitored resistance spot welding process.

13. The system of claim 11 wherein the machine learning model is a neural network including a plurality of convolution layers and a plurality of fully-connected decision layers.

14. The system of claim 13 wherein an output of the at least one of the plurality of decision layers encodes a state of the resistance spot-welding process.

15. The system of claim 11 further including at least one ultrasonic sensor generating the sampled ultrasonic signature received in step a).

16. The system of claim 11 wherein the sampled ultrasonic signature received in step a) is generated during the resistance spot-welding process in which electrodes are applying current and force based upon commands from a weld controller.

17. The system of claim 11 wherein the machine learning model includes multiple submodels.

18. A resistance spot-welding inspection system comprising:
    at least one ultrasonic sensor generating at least one sampled ultrasonic signature;
    at least one processor; and
    at least one non-transitory computer-readable media storing:

a machine learning model, that has been trained using a dataset of a plurality of ultrasonic signatures generated during a plurality of resistance spot weld monitoring processes, wherein each of the plurality of ultrasonic signatures includes an M-scan, the machine learning model is a neural network including a plurality of convolution layers and a plurality of fully-connected decision layers; and instructions that, when executed by the at least one processor, cause the resistance spot-welding inspection system to perform the following:

a) receiving the at least one sampled ultrasonic signature from the at least one ultrasonic sensor generated during a monitored resistance spot welding process in which electrodes are applying current and force based upon commands from a weld controller, wherein the at least one sampled ultrasonic signature includes a sampled M-scan;

b) using the machine learning model to process the at least one sampled ultrasonic signature; and c) evaluating the monitored resistance spot-welding process based upon b);

d) based upon step b) identifying key physical measurements of monitored resistance spot-welding process events in the monitored resistance spot-welding process including at least one event selected from a group consisting of: onset of weld nugget, time at which an interface has been penetrated by the weld nugget, rate of weld nugget formation, solidification, and penetration depth into each of a pair of outermost sheets subject to the monitored resistance spot welding process;

e) altering commands from a weld controller based upon steps b) to d) for a subsequent resistance spot welding process;

wherein an output of the at least one of the plurality of decision layers encodes a state of the resistance spot-welding process.

19. A resistance spot-welding inspection system comprising:

at least one ultrasonic sensor generating at least one sampled ultrasonic signature;

at least one processor; and at least one non-transitory computer-readable media storing:

a machine learning model, that has been trained using a dataset of a plurality of ultrasonic signatures generated during a plurality of resistance spot weld monitoring processes, wherein each of the plurality of ultrasonic signatures includes an M-scan, the machine learning model is a neural network including a plurality of convolution layers and a plurality of fully-connected decision layers; and instructions that, when executed by the at least one processor, cause the resistance spot-welding system to perform the following:

a) receiving the at least one sampled ultrasonic signature from the at least one ultrasonic sensor generated during a monitored resistance spot welding process in which electrodes are applying current and force based upon commands from a weld controller, wherein the at least one sampled ultrasonic signature includes a sampled M-scan;

b) using the machine learning model to process the at least one sampled ultrasonic signature; and c) evaluating the monitored resistance spot-welding process based upon b);

d) based upon step b) identifying key physical measurements of monitored resistance spot-welding process events in the monitored resistance spot-welding process including at least one event selected from a group consisting of: onset of weld nugget, time at which an interface has been penetrated by the weld nugget, rate of weld nugget formation, solidification, and penetration depth into each of a pair of outermost sheets subject to the monitored resistance spot welding process; and e) altering commands from a weld controller based upon steps b) to d) for the monitored resistance spot welding process;

wherein an output of the at least one of the plurality of decision layers encodes a state of the resistance spot-welding process.

* * * * *